(12) United States Patent
Hirano

(10) Patent No.: US 7,734,547 B2
(45) Date of Patent: Jun. 8, 2010

(54) DISPLAY CONTROL APPARATUS, DISPLAY CONTROL METHOD, AND STORAGE MEDIUM STORING DISPLAY CONTROL PROGRAM

(75) Inventor: Yasuhiro Hirano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 715 days.

(21) Appl. No.: 11/354,953

(22) Filed: Feb. 16, 2006

(65) Prior Publication Data

US 2007/0043673 A1 Feb. 22, 2007

(30) Foreign Application Priority Data

Aug. 18, 2005 (JP) .............................. P2005-237592

(51) Int. Cl.
*G06F 21/00* (2006.01)
(52) U.S. Cl. .............................. 705/51; 705/64; 705/67
(58) Field of Classification Search .................... 705/51, 705/64, 67
See application file for complete search history.

(56) References Cited

U.S. PATENT DOCUMENTS 7,197,694 B2 * 3/2007 Ikegami ...................... 715/234

| | | | |
|---|---|---|---|
| 2007/0154111 A1 * | 7/2007 | Ikegami ...................... | 382/282 |
| 2008/0077600 A1 * | 3/2008 | Nakamura et al. .......... | 707/100 |
| 2008/0154633 A1 * | 6/2008 | Ishibashi et al. ............... | 705/1 |
| 2008/0255893 A1 * | 10/2008 | Barker et al. .................... | 705/7 |

FOREIGN PATENT DOCUMENTS

| JP | A-2004-093885 | 3/2004 |
|---|---|---|
| JP | 2008236254 A * | 10/2008 |

* cited by examiner

*Primary Examiner*—Pierre E Elisca
(74) *Attorney, Agent, or Firm*—Morgan, Lewis & Bockius LLP

(57) ABSTRACT

A display control apparatus for controlling display of a document on a display part, includes an acquiring section that acquires authentication information associated with a user entering a predefined area, a deciding section that decides whether or not the authentication information acquired by the acquiring section satisfies a display authorization condition associated with the document, and a limiting section that limits display of the document on the display part when the deciding section decides that the authentication information does not satisfy the display authorization condition.

10 Claims, 13 Drawing Sheets

FIG. 5

| CANDIDATE DOCUMENT IDENTIFICATION INFORMATION | AUTHORIZED PERSON IDENTIFICATION INFORMATION | CONTENTS OF DISPLAY LIMIT PROCESSING |
|---|---|---|
| M1 | A, B, C, D | NON-DISPLAY |
| M2 | A, B, C | FILL |
| M3 | A, C | NON-DISPLAY |
| M4 | A, B, C | NON-DISPLAY |
| ⋮ | ⋮ | ⋮ |

FIG. 7

| TARGET DOCUMENT IDENTIFICATION INFORMATION | AUTHORIZED PERSON IDENTIFICATION INFORMATION | CONTENTS OF DISPLAY LIMIT PROCESSING | DISPLAY STATE INFORMATION |
|---|---|---|---|
| M1 | A, B, C, D | NON-DISPLAY | IN DISPLAY |
| M2 | A, B, C | FILL | IN DISPLAY |
| M3 | A, C | NON-DISPLAY | IN LIMIT ON DISPLAY |

FIG. 10

| TARGET DOCUMENT IDENTIFICATION INFORMATION | TARGET PART IDENTIFICATION INFORMATION | AUTHORIZED PERSON IDENTIFICATION INFORMATION | CONTENTS OF DISPLAY LIMIT PROCESSING |
|---|---|---|---|
| M1 | X | A, D | FILL |
| | P | A, B, C | NON-DISPLAY |
| M2 | Y | A, B, C | FILL |
| | Q | A, B, C, D | NON-DISPLAY |
| ⋮ | ⋮ | ⋮ | ⋮ |

FIG. 13

| TARGET DOCUMENT IDENTIFICATION INFORMATION | TARGET PART IDENTIFICATION INFORMATION | AUTHORIZED PERSON IDENTIFICATION INFORMATION | CONTENTS OF DISPLAY LIMIT PROCESSING | DISPLAY STATE INFORMATION |
|---|---|---|---|---|
| M1 | X | A, C | FILL | IN LIMIT ON DISPLAY |
| | P | A, B, C | NON-DISPLAY | IN DISPLAY |
| M2 | Y | A, B, C | FILL | IN DISPLAY |
| | Q | A, B, C, D | NON-DISPLAY | IN DISPLAY |

DISPLAY CONTROL APPARATUS, DISPLAY CONTROL METHOD, AND STORAGE MEDIUM STORING DISPLAY CONTROL PROGRAM

This application claims the benefit of Japanese Patent Application No. 2005-237592 filed on Aug. 18, 2005, which is hereby incorporated by reference.

BACKGROUND OF THE INVENTION (i) Field of the Invention

The present invention relates to a display control technology, which is effectively applicable, for example, to an apparatus, a method and a storage medium storing a program for controlling display of a confidential document.

(ii) Description of the Related Art

In the case of using a confidential document, access right in which readout by other people cannot be performed so that the document is not browsed by other people has been set generally.

However, conventionally, for example, even for a document in which access right is set, once the document is displayed on a predetermined display part, everybody having access to the display part can easily see the contents of display of the document, so that confidentiality of the document was lost.

SUMMARY OF THE INVENTION

The invention has been implemented in view of the problem described above.

According to an aspect of the present invention, a display control apparatus for controlling display of a document on a display part includes an acquiring section that acquires authentication information associated with a user entering a predefined area, a deciding section that decides whether or not the authentication information acquired by the acquiring section satisfies a display authorization condition associated with the document, and a limiting section that limits display of the document on the display part when the deciding section decides that the authentication information does not satisfy the display authorization condition.

According to another aspect of the present invention, a display control apparatus for controlling display on a display part includes an acquiring section that acquires authentication information associated with at least one of a user entering a predefined area, a user exiting from the predefined area and a user staying in the predefined area, and a control section that controls display of at least a part of a display region of the display part based on the acquired authentication information.

According to still another aspect of the present invention, a method for controlling display of a document on a display part includes acquiring authentication information associated with a user entering a predefined area, deciding whether or not the acquired authentication information satisfies a display authorization condition associated with a document, and limiting display of the document on a display part when the acquired authentication information does not satisfy the display authorization condition.

According to still another aspect of the present invention, a storage medium readable by a computer stores a program of instructions executable by the computer to perform a function for controlling display of a document on a display part. The function includes acquiring authentication information associated with a user entering a predefined area, deciding whether or not the acquired authentication information satisfies a display authorization condition associated with a document, and limiting display of the document on a display part when the acquired authentication information does not satisfy the display authorization condition.

BRIEF DESCRIPTION OF THE DRAWINGS

Embodiment(s) of the present invention will be described in detail based on the following figures, wherein:

FIG. 5 is an explanatory diagram of one example of a candidate document table according to the exemplary embodiment of the invention;

FIG. 7 is an explanatory diagram of one example of processing target data according to the exemplary embodiment of the invention;

FIG. 10 is an explanatory diagram of another example of a candidate document table according to the exemplary embodiment of the invention;

FIG. 13 is an explanatory diagram of another example of processing target data according to the exemplary embodiment of the invention.

DETAILED DESCRIPTION OF THE INVENTION

Figure 1:
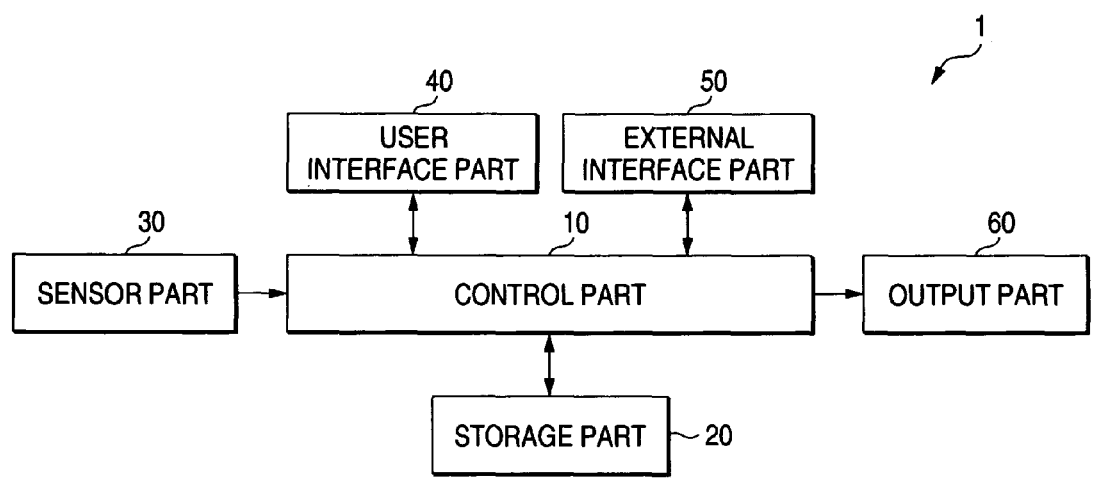
FIG. 1 is a configuration block diagram of a document display processing apparatus according to one exemplary embodiment of the invention.

A document display control apparatus according to one exemplary embodiment of the invention will be described below with reference to the drawings. FIG. 1 is a block diagram showing a main configuration of a document display control apparatus 1 (hereinafter called the present apparatus 1) according to the present embodiment.

As shown in FIG. 1, the present apparatus 1 is configured to include a control part 10, a storage part 20, a sensor part 30, a user interface part 40, an external interface part 50 and an output part 60.

The control part 10 is implemented by a CPU (Central Processing Unit) etc. and operates according to a program stored in the storage part 20. The concrete contents of processing performed by this control part 10 will be described below in detail.

The storage part 20 can be implemented by memory elements such as RAM (Random Access Memory) or ROM (Read Only Memory) and a hard disk, etc. This storage part 20 stores programs (software) executed by the control part 10. Also, this storage part 20 operates as work memory for holding various data used in a process of processing of the control part 10.

The sensor part 30 can be implemented by a reader/writer device of a contact or non-contact type of an IC (Integrated Circuit) card or an infrared sensor, etc. This sensor part 30 acquires authentication information associated with a user targeted for authentication from the IC card etc. carried by the user targeted for authentication, and outputs the authentication information to the control part 10.

The user interface part 40 can be implemented by input devices (for example, a keyboard, a mouse or a touch pad) or a touch panel, etc. This user interface part 40 accepts an input of a display command etc. of a document from a user, and outputs the input to the control part 10.

The external interface part 50 can be implemented by a USB (Universal Serial Bus) interface or a network card, etc. This external interface part 50 is connected to a network such as a LAN (Local Area Network) or the Internet, and accepts a display command etc. from a personal computer etc. connected to the network through the network, and outputs the display command etc. to the control part 10.

The output part 60 can be implemented by a projector device etc. for displaying a document on a display part such as a screen. This output part 60 displays a document inputted from the control part 10 on the screen according to instructions inputted from the control part 10.

Figure 2:
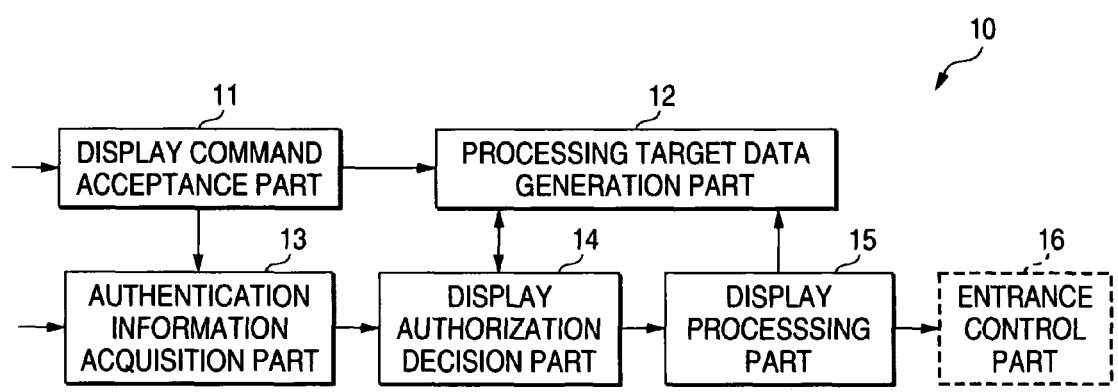
FIG. 2 is a functional block diagram of a control part according to the exemplary embodiment of the invention.

Next, the contents of processing performed by the control part 10 will be described. FIG. 2 is a functional block diagram showing main processing performed by the control part 10. As shown in FIG. 2, a program executed by this control part 10 functionally includes a display command acceptance part 11, a processing target data generation part 12, an authentication information acquisition part 13, a display authorization decision part 14, a display processing part 15 and an entrance control part 16.

The display command acceptance part 11 accepts a command to give instructions to display a particular document. That is, this display command acceptance part 11 accepts, for example, a command to give instructions to display a part of the document of plural documents held in the storage part 20 from the user interface part 40 or the external interface part 50.

Concretely, for example, when a user inputs a command to give instructions to display a particular document held in the storage part 20 from the user interface part 40, the display command acceptance part 11 accepts the display command from the user interface part 40.

Also, for example, when a user inputs a command to give instructions to display a particular document held in a server computer connected to the external interface part 50 through a LAN by operating a device for input of the server computer, the display command acceptance part 11 accepts the display command through the LAN. This display command acceptance part 11 outputs the accepted display command to the processing target data generation part 12.

The processing target data generation part 12 generates processing target data indicating a state of display processing of a document related to a display command accepted from the display command acceptance part 11, that is, a document (hereinafter called a target document) targeted for display processing in the present apparatus 1.

That is, this processing target data generation part 12 generates, for example, processing target data mutually associating identification information for identifying a target document and display state information indicating whether display of the target document is authorized or limited.

Concretely, for example, the storage part 20 holds a data table (hereinafter called a candidate document table) of mutually associating identification information for identifying each of the plural candidate documents capable of being targeted for display processing and a display authorization condition indicating a condition of authorizing display of each of the candidate documents and when a display command specifies a part of the plural candidate documents as a target document, with reference to the candidate document table, the processing target data generation part 12 outputs identification information (hereinafter called target document identification information) for identifying a target document related to the display command and a display authorization condition associated with the target document to the display authorization decision part 14.

Also, for example, when a candidate document is a part of the candidate documents and includes a part (hereinafter called a limit target part) capable of being targeted for display limit processing, the storage part 20 may hold a candidate document table of mutually associating identification information (hereinafter called target part identification information) for identifying the limit target part and a display authorization condition indicating a condition of authorizing display of the limit target part.

This limit target part is at least a part of the contents of display of a document, for example, a text part (a particular character string, keyword, etc.), a figure or a photograph included in the document, and is a part previously specified to authorize only a particular user's use.

In this case, with reference to the candidate document table, the processing target data generation part 12 outputs, for example, a target document related to a display command, partial identification information related to a limit target part included in the target document and a display authorization condition related to the limit target part to the display authorization decision part 14.

Then, this processing target data generation part 12 accepts a result of a decision as to whether or not to authorize display of a limit target part or a target document described below from the display authorization decision part 14, and generates processing target data mutually associating the decision result and target document identification information or partial identification information.

Also, this processing target data generation part 12 may accept, for example, a display processing result indicating whether or not a target document or a limit target part is actually displayed from the display processing part 15, and generate processing target data mutually associating the display processing result and target document identification information or partial identification information.

Also, in the case of accepting notification of requesting processing target data from the display authorization decision part 14, this processing target data generation part 12 outputs already generated and held processing target data to the display authorization decision part 14 according to the request.

The authentication information acquisition part 13 acquires authentication information associated with a user entering an area (hereinafter called a specified area) predefined as an area where a person is capable of visually recognizing the contents of a document displayed on a display part.

Here, for example, when a target document is displayed on a predetermined display part in the present apparatus 1, this specified area is specified as an area in which the contents of the displayed target document may be visually recognized by a user. Concretely, for example, when a target document is displayed on a screen installed inside a meeting room, an area including a predetermined area in the vicinity of a doorway to the meeting room and the whole area of the inside of the meeting room is set as the specified area. Incidentally, this specified area can be set regardless of whether or not a user can visually recognize actually the contents of display on the display part.

The authentication information acquisition part 13 acquires authentication information associated with at least a part of the users among a user newly entering this specified area, a user exiting from this specified area or a user staying in this specified area.

Concretely, for example, when the sensor part 30 is constructed as a part of the reader device for reading information recorded on a non-contact type IC tag used in the so-called RFID (Radio Frequency Identification), the authentication information acquisition part 13 acquires identification information for identifying the user read by the sensor part 30 from the IC tag carried by a new user entering the specified area as authentication information from the sensor part 30. Also, this authentication information acquisition part 13 acquires authentication information recorded on the IC tag carried by, for example, a user staying in the specified area in like manner.

Also, this authentication information acquisition part 13 can acquire authentication information at any timing. That is, this authentication information acquisition part 13 acquires authentication information periodically at predetermined time intervals, for example, according to a predetermined schedule. Also, this authentication information acquisition part 13 acquires authentication information at timing, for example, timing of receiving notification that entrance and exit of a user to and from the specified area are detected from the sensor part 30, timing of accepting a command to give instructions to acquire authentication information from a user through the user interface part 40 or timing of accepting notification that a display command is inputted from the display command acceptance part 11. This authentication information acquisition part 13 outputs the acquired authentication information to the display authorization decision part 14.

Based on target document identification information or partial identification information and a display authorization condition accepted from the processing target data generation part 12 and authentication information accepted from the authentication information acquisition part 13, the display authorization decision part 14 decides whether or not the authentication information satisfies the display authorization condition associated with a limit target part related to the partial identification information or a target document related to the target document identification information.

That is, this display authorization decision part 14 authorizes display of a target document or a limit target part, for example, when authentication information satisfies a display authorization condition related to the target document or the limit target part, and decides that display of the target document or the limit target part should be limited when the authentication information does not satisfy the display authorization condition.

Concretely, for example, when a display authorization condition includes identification information (hereinafter called authorized person identification information) for identifying each of the plural users authorized to use a target document or a limit target part, this display authorization decision part 14 decides whether or not identification information (hereinafter called authentication target identification information) for identifying a user accepted from the authentication information acquisition part 13 as authentication information is included in plural pieces of the authorized person identification information.

Then, this display authorization decision part 14 authorizes display of a target document or a limit target part when authentication target identification information is included in all the authorized person identification information, and decides that display of the limit target part or the target document with which the authorized person identification information which does not include the authentication target identification information is associated should be limited when the authentication target identification information is not included in the authorized person identification information. This display authorization decision part 14 outputs this decision result of display authorization to the processing target data generation part 12.

Also, when this display authorization decision part 14 decides to authorize display of a target document or a limit target part, the display processing part 15 is instructed to display the target document or the limit target part. Also, when this display authorization decision part 14 decides that display of a target document or a limit target part should be limited, the display processing part 15 is instructed to limit the display of the target document or the limit target part.

The display processing part 15 performs display processing of a target document related to instructions according to the instructions accepted from the display authorization decision part 14. That is, for example, when this display processing part 15 is instructed to display a target document or a limit target part, the output part 60 is made to display the target document or the limit target part.

Also, for example, when this display processing part 15 is instructed to limit display of a target document or a limit target part, the output part 60 is made to limit the display of the target document or the limit target part.

Here, the contents of this display limit processing may be held and associated with each of the candidate documents, for example, in a candidate document table previously. In this case, the display processing part 15 reads out the contents of display limit processing associated with a target document or a limit target part instructed to perform display from the display authorization decision part 14 in the candidate document table, and displays the target document or the limit target part in which the display limit processing is performed.

Incidentally, as the contents of this display limit processing, setting can be made arbitrarily, for example, a target document or a limit target part is not displayed (non-display), or the contents of display of the target document or the limit target part are displayed by solid fill, mosaic processing, reduction, etc. in a form in which the display contents cannot be visually recognized substantially.

Also, for example, a user inputs the contents of this display limit processing to the control part 10 through the user interface part 40 or the external interface part 50 and thereby the contents may be specified. In this case, the display processing part 15 limits display of the target document or the limit target part by the display limit processing specified from the user.

Figure 3:
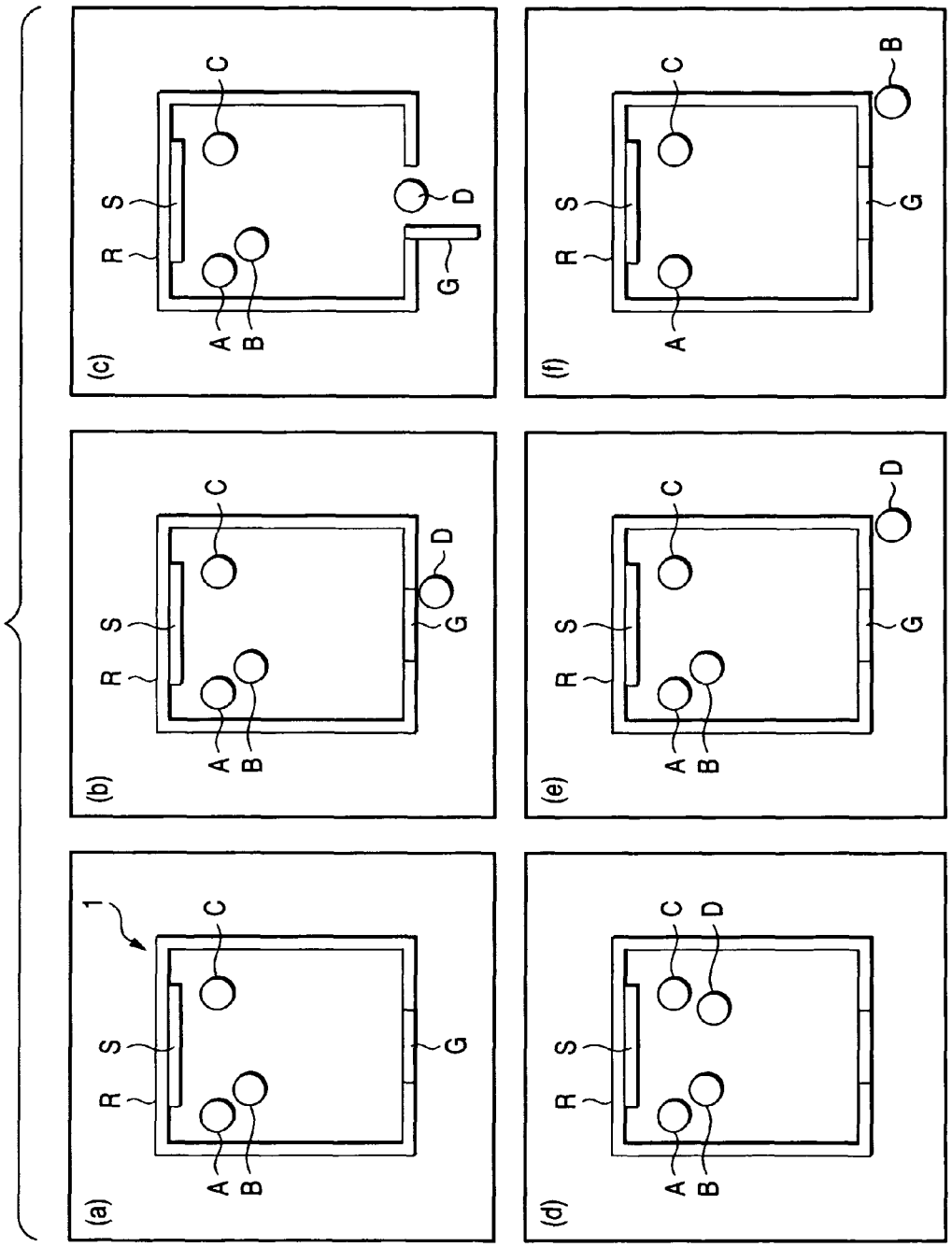
FIG. 3 is an explanatory diagram of one example of the document display processing apparatus constructed as meeting facilities in the exemplary embodiment of the invention.

Next, a concrete example of display processing of a document using the present apparatus 1 will be described. The case of constructing the present apparatus 1 as meeting facilities including a meeting room R provided with a gate G as a doorway of a user, a screen S installed inside the meeting room R, a projector device (not shown) for displaying a target document on the screen S and an IC card reader device (not shown) for reading authentication information recorded on an IC card carried by a user as shown in FIG. 3 will be described herein as an example.

Figure 4:
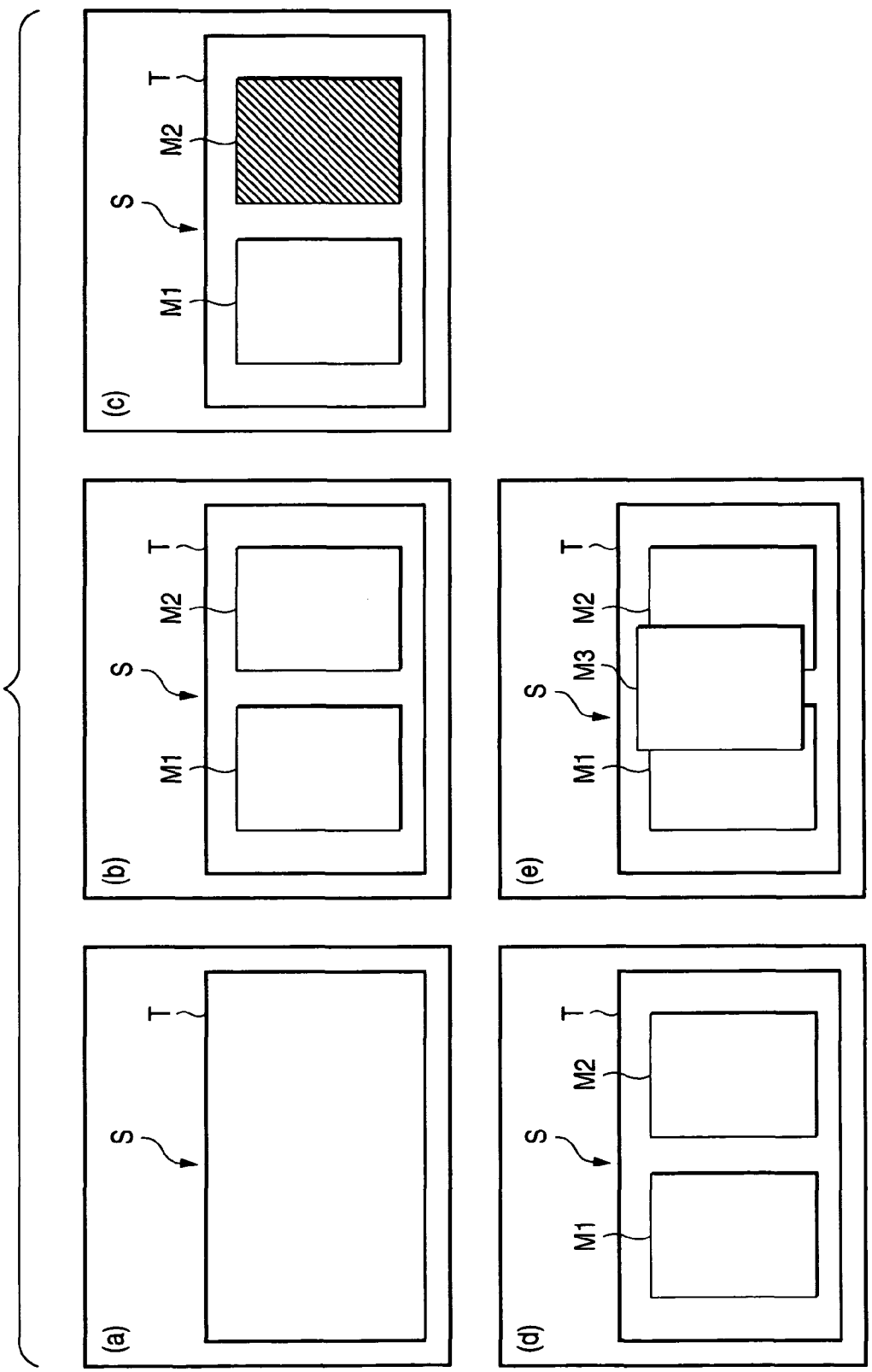
FIG. 4 is an explanatory diagram of one example of a document displayed on a display part in the exemplary embodiment of the invention.

The projector device included in this apparatus 1 displays one or plural target documents on a part of a rectangular display region T of the screen S as shown in FIG. 4. Also, in the present example, a particular instructor sends a display command of a document to the present apparatus 1 from a server computer (not shown) which is installed in a room separate from the meeting room R and is connected to the projector device of the present apparatus 1 through a LAN.

Also, the present apparatus 1 holds a candidate document table of mutually associating identification information (M1, M2, etc.) for identifying each of the plural candidate documents, authorized person identification information (A, B, etc.) related to each of the candidate documents and the contents ("non-display" or "solid fill display") of display limit processing related to each of the candidate documents as shown in FIG. 5.

Figure 6:
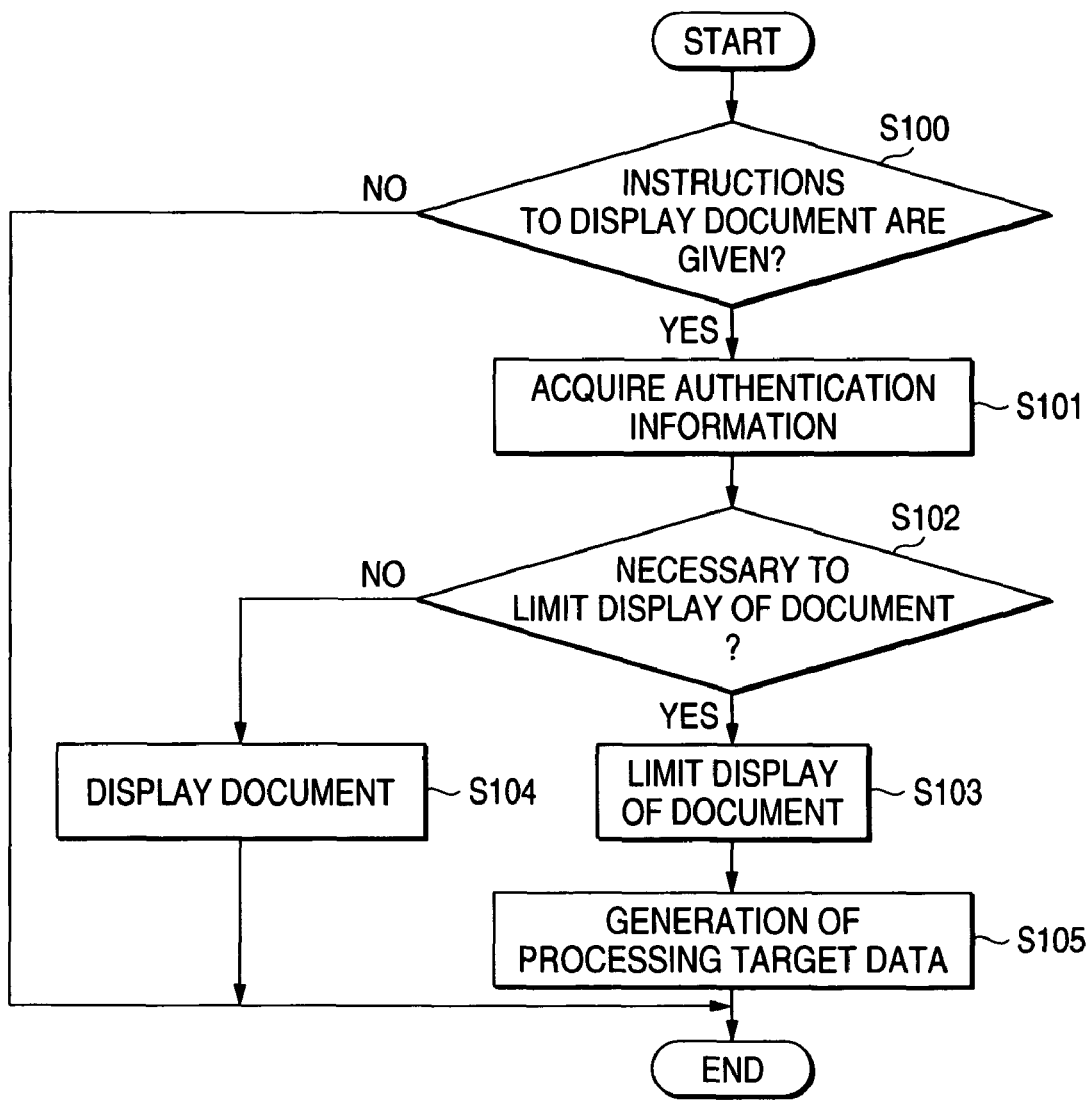
FIG. 6 is a flow diagram of one example of processing performed by the document display processing apparatus according to the exemplary embodiment of the invention.

One example of the case where the present apparatus 1 accepts a display command of a new target document will be first described. FIG. 6 shows one example of a flow of main processing performed by the present apparatus 1 in this case.

As shown in FIG. 3a, the display command acceptance part 11 decides whether or not a display command is accepted in a state (FIG. 4a) in which no display is performed on the screen S inside the meeting room R in which three users of a first user (A), a second user (B) and a third user (C) respectively identified by identification information A, B, C stay (S100 of FIG. 6).

When the display command acceptance part 11 accepts a command to give instructions to display three documents of a first document (M1), a second document (M2) and a third document (M3) respectively identified by identification information M1, M2, M3 among plural candidate documents included in the candidate document table (FIG. 5) as target documents (Yes in S100 of FIG. 6), the display command acceptance part 11 outputs the display command to the processing target data processing part 12. Also, this display command acceptance part 11 notifies the authentication information acquisition part 13 that the display command is accepted. Incidentally, when the display command acceptance part 11 does not accept the display command (No in S100 of FIG. 6), the present apparatus 1 ends the processing.

The processing target data generation part 12 respectively outputs authorized person identification information (A, B, etc.) and target document identification information (M1, M2, M3) associated with each of the target documents related to notification accepted from the display command acceptance part 11 with reference to the candidate document table shown in FIG. 5 to the display authorization decision part 14.

Also, the authentication information acquisition part 13 receives notification from the display command acceptance part 11, and acquires identification information A, B, C associated with each of the users recorded on IC cards carried by each of the three users staying in the meeting room R from the sensor part 30 (S101 of FIG. 6), and outputs the identification information to the display authorization decision part 14 as authentication target identification information.

The display authorization decision part 14 decides whether or not display of each of the target documents should be limited based on a decision as to whether or not each of the authentication target identification information A, B, C is included in authorized person identification information about each of the target documents (S102 of FIG. 6).

Then, the identification information B about the second user of the three pieces of authentication target identification information A, B, C is not included in authorized person identification information about the third document (M3) of the three target documents (FIG. 5), so that the display authorization decision part 14 decides that display of the third document should be limited (Yes in S102 of FIG. 6).

In this case, the display authorization decision part 14 instructs the display processing part 15 to limit display of the third document by the display limit contents (non-display) associated with the third document targeted for this display limit processing in the candidate document table shown in FIG. 5.

The display processing part 15 performs display limit processing in which the third document (M3) is not displayed on the screen S as shown in FIG. 4b according to instructions accepted from the display authorization decision part 14 (S103 of FIG. 6).

On the other hand, all the three pieces of authentication target identification information A, B, C are respectively included in authorized person identification information associated with the first document (M1) and authorized person identification information associated with the second document (M2) of the three target documents (FIG. 5), so that the display authorization decision part 14 decides that display of the two target documents may be authorized (No in S102 of FIG. 6).

In this case, the display authorization decision part 14 instructs the display processing part 15 to display the two target documents. The display processing part 15 respectively displays the two target documents on a part of the display region T of the screen S as shown in FIG. 4b (S104 of FIG. 6). Also, this display authorization decision part 14 outputs a decision result of display authorization related to the target document to the processing target data generation part 12.

Based on the decision result accepted from the display authorization decision part 14, the processing target data generation part 12 generates a data table of mutually associating identification information (M1, M2, M3) about each of the target documents targeted for a display command, authorized person identification information, the contents of display limit processing and display state information indicating whether or not display of each of the target documents is limited as shown in FIG. 7 as processing target data (S105 of FIG. 6).

That is, in the processing target data shown in FIG. 7, display state information indicating that it is in display (that is, display is not limited) is associated with target document identification information about the first document (M1) and the second document (M2) and display state information indicating that display is limited is associated with target document identification information about the third document (M3), respectively.

Also, the display authorization decision part 14 outputs a decision result of display authorization related to a target document to a server computer which sends a display command from the external interface part 50 to the display command acceptance part 11 through a LAN. As a result of this, an instructor who inputs a display command from the external interface part 50 can check that the first document and the second document of the three target documents in which display is instructed in the display command are displayed as instructed but display is limited in the third document.

Figure 8:
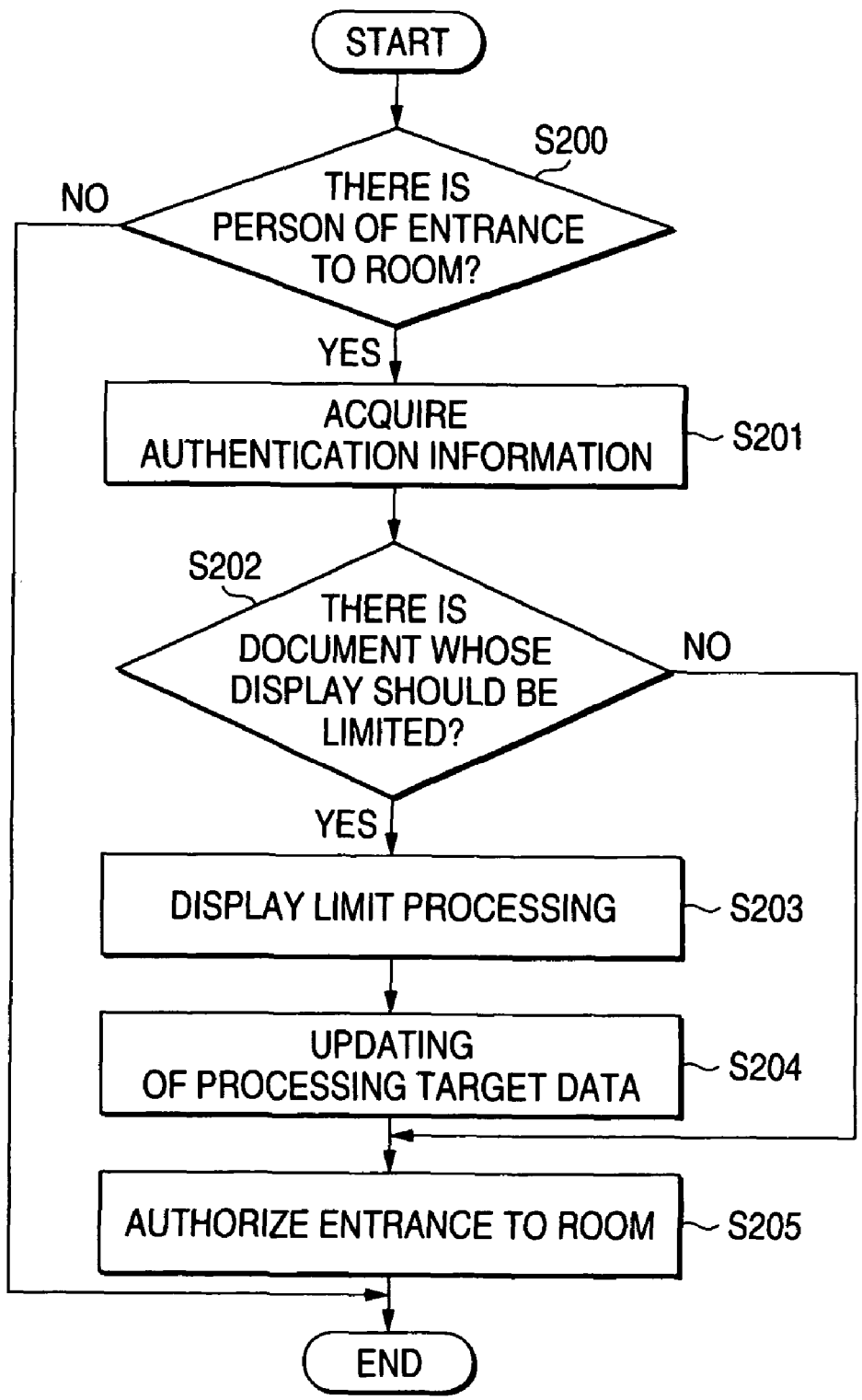
FIG. 8 is a flow diagram of another example of processing performed by the document display processing apparatus according to the exemplary embodiment of the invention.

Next, one example of the case where there is a person of entrance to the meeting room R will be described. FIG. 8 shows one example of a flow of main processing performed by the present apparatus 1 in this case.

In this case, the sensor part 30 decides whether or not there is a user newly entering a specified area (meeting room R) (S200 of FIG. 8). Then, in the case of detecting that a new fourth user (D) identified by identification information D arrives at the front of the gate G as shown in FIG. 3b, this sensor part 30 decides that there is a new person of entrance to the room (Yes in S200 of FIG. 8), and notifies the authentication information acquisition part 13 of that effect.

The authentication information acquisition part 13 receives notification from the sensor part 30, and acquires identification information D (hereinafter called entrance room person identification information) for identifying the fourth user recorded on an IC card carried by the fourth user from the sensor part 30 (S201 of FIG. 8), and outputs the identification information to the display authorization decision part 14. Incidentally, when the authentication information acquisition part 13 does not accept notification that there is a new person of entrance to the room from the sensor part 30 (No in S200 of FIG. 8), the present apparatus 1 once ends this processing and again performs this processing after a lapse of a predetermined time.

The display authorization decision part 14 decides whether or not the entrance room person identification information D accepted from the authentication information acquisition part 13 is included in each of the authorized person identification information about two target documents whose display is not limited with reference to processing target data (FIG. 7) already generated and held by the processing target data generation part 12, and decides whether or not display of each of the target documents should be limited based on the decision result (S202 of FIG. 8).

Then, the entrance room person identification information D is not included in authorized person identification information about the second document of the first document and the second document displayed on the screen S (FIG. 7), so that this display authorization decision part 14 decides that display of the second document should be limited (Yes in S202 of FIG. 8).

In this case, the display authorization decision part 14 instructs the display processing part 15 to limit display of the second document by the display limit contents (solid fill) associated with the second document newly targeted for the display limit in the processing target data.

The display processing part 15 performs display limit processing for changing the second document visually recognizably displayed on a part of the display region T of the screen S (FIG. 4b) into solid fill display so that the contents of display of the second document cannot be visually recognized as shown in FIG. 4c according to instructions accepted from the display authorization decision part 14 (S203 of FIG. 8). Incidentally, when the entrance room person identification information is included in authorized person identification information about all the target documents in display and the display authorization decision part 14 decides that it is unnecessary to perform new display limit processing (No in S202 of FIG. 8), the entrance control part 16 authorizes the fourth user to enter the room (S205 of FIG. 8) and ends the processing. Authorization of entrance to the room is implemented, for example, by interlocking the present apparatus 1 with a lock mechanism of a door or a gate and giving instructions to unlock the door or the gate through the entrance control part 16. Also, this display authorization decision part 14 outputs this decision result to the processing target data generation part 12. Also, this display authorization decision part 14 outputs this decision result from the external interface part 50 to a server computer and notifies an instructor.

The processing target data generation part 12 updates the processing target data so that display state information about the second document whose display is newly limited among the processing target data shown in FIG. 7 is changed into a state "in limit on display" based on the decision result accepted from the display authorization decision part 14 (S204 of FIG. 8).

Also, in the present apparatus 1, the fourth user (D) is authorized to enter the meeting room R by opening the gate G (FIG. 3c) at timing of completing display processing of a target document based on authentication processing of the fourth user (D) attempting to enter the meeting room R (S205 of FIG. 8). As a result of this, in the meeting room R, the four users conduct a meeting while seeing the first document displayed without being limited and the second document displayed in a limit manner (FIG. 4c) as shown in FIG. 3d.

Figure 9:
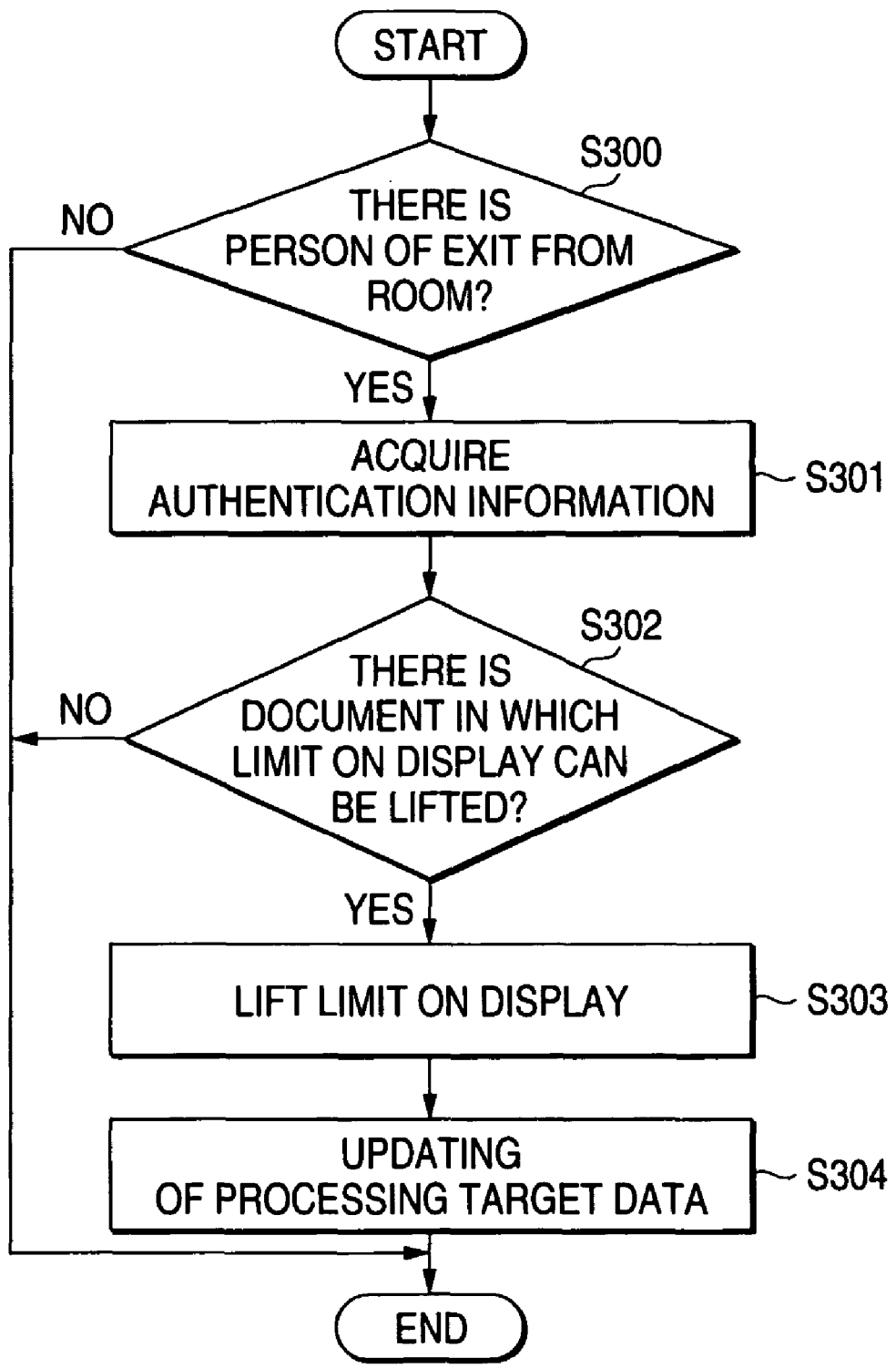
FIG. 9 is a flow diagram of a further example of processing performed by the document display processing apparatus according to the exemplary embodiment of the invention.

Next, one example of the case where there is a person of exit from the meeting room R will be described. FIG. 9 shows one example of a flow of main processing performed by the present apparatus 1 in this case.

In this case, the sensor part 30 decides whether or not there is a user exiting from a specified area (meeting room R) (S300 of FIG. 9). Then, in the case of detecting that the fourth user (D) exits the meeting room R from the gate G as shown in FIG. 3e, this sensor part 30 decides that there is the person of exit from the room (Yes in S300 of FIG. 9), and notifies the authentication information acquisition part 13 of that effect.

The authentication information acquisition part 13 acquires identification information (hereinafter called stay room person identification information) which is read out of IC cards carried by all the users, that is, each of the first user, the second user and the third user staying in the meeting room R after this fourth user exits from the room and is associated with each of the users from the sensor part 30 (S301 of FIG. 9), and outputs the identification information to the display authorization decision part 14. Incidentally, when the authentication information acquisition part 13 does not accept notification that there is the person of exit from the room from the sensor part 30 (No in S300 of FIG. 9), the present apparatus 1 once ends this processing and again performs this processing after a lapse of a predetermined time.

The display authorization decision part 14 decides whether or not each of the stay room person identification information accepted from the authentication information acquisition part 13 is included in authorized person identification information about each of the target documents whose display is limited with reference to the latest (updated) processing target data held by the processing target data generation part 12, and decides whether or not a limit on display of each of the target documents can be lifted based on the decision result (S302 of FIG. 9).

Then, all the three pieces of stay room person identification information are included in authorized person identification information associated with the second document (M2) of the third document and the second document whose display is limited (FIG. 7), so that this display authorization decision part 14 decides that display of the second document may again be authorized, that is, a limit on display of the second document may be lifted (Yes in S302 of FIG. 9).

In this case, the display authorization decision part 14 instructs the display processing part 15 to lift a limit on display of this second document whose display is again authorized. According to instructions accepted from the display authorization decision part 14, the display processing part 15 lifts the limit (solid fill) on display of the second document related to the instructions (S303 of FIG. 9), and again displays the second document on a part of the screen S so that the display contents can be visually recognized as shown in FIG. 4d. Incidentally, when at least one of the three pieces of stay room person identification information is not included in authorized person identification information about each of the target documents whose display is limited, the display authorization decision part 14 decides that there is no target document in which a limit on display can be lifted (No in S302 of FIG. 9), and the present apparatus 1 ends the processing. This display authorization decision part 14 outputs this decision result from the external interface part 50 to a server computer, and also outputs the decision result to the processing target data generation part 12.

The processing target data generation part 12 updates the processing target data so that display state information about the second document in which a limit on display is lifted among the held processing target data is changed into a state "in display" (no limit on display) based on the accepted decision result (S304 of FIG. 9).

Also, further, when the sensor part 30 detects that the second user exits from the room thereafter as shown in FIG. 3f, the sensor part 30 decides that there is the person of exit from the room (Yes in S300 of FIG. 9), and notifies the authentication information acquisition part 13 of that effect.

In this case, the authentication information acquisition part 13 acquires identification information (stay room person identification information) associated with each of the users recorded on IC cards carried by all the users, that is, each of the first user (A) and the third user (C) staying in the meeting room R after this second user (B) exits from the room from the sensor part 30 (S301 of FIG. 9), and outputs the identification information to the display authorization decision part 14.

The display authorization decision part 14 decides whether or not each of the stay room person identification information accepted from the authentication information acquisition part 13 is included in authorized person identification information about the first document whose display is limited with reference to the processing target data held by the processing target data generation part 12, and decides whether or not a limit on display of the first document can be lifted based on the decision result (S302 of FIG. 9).

Then, both the two pieces of stay room person identification information are included in authorized person identification information associated with this first document (FIG. 7), so that this display authorization decision part 14 decides that a limit on display of the first document may be lifted (Yes in S302 of FIG. 9).

In this case, the display authorization decision part 14 instructs the display processing part 15 to lift a limit on display of the first document whose display is newly authorized. According to instructions accepted from the display authorization decision part 14, the display processing part 15 lifts the limit (non-display) on display of the first document (S303 of FIG. 9), and newly displays the first document on a part of the screen S as shown in FIG. 4e.

Incidentally, also in this case, the display authorization decision part 14 outputs this decision result to a server computer and the processing target data generation part 12, and the processing target data generation part 12 updates the processing target data so that display state information about the first document in which a limit on display is newly lifted is changed into a state "in display" (S304 of FIG. 9).

Also, the present apparatus 1 may hold a candidate document table of mutually associating identification information (M1, M2, etc.) for identifying each of the plural candidate documents, partial identification information (X, P, etc.) which is a part of each of the candidate documents and identifies a limit target part capable of being targeted for a limit on display, authorized person identification information (A, B, etc.) related to each of the limit target parts and the contents ("non-display" or "solid fill") of display limit processing related to each of the limit target parts as shown in FIG. 10.

Figure 11:
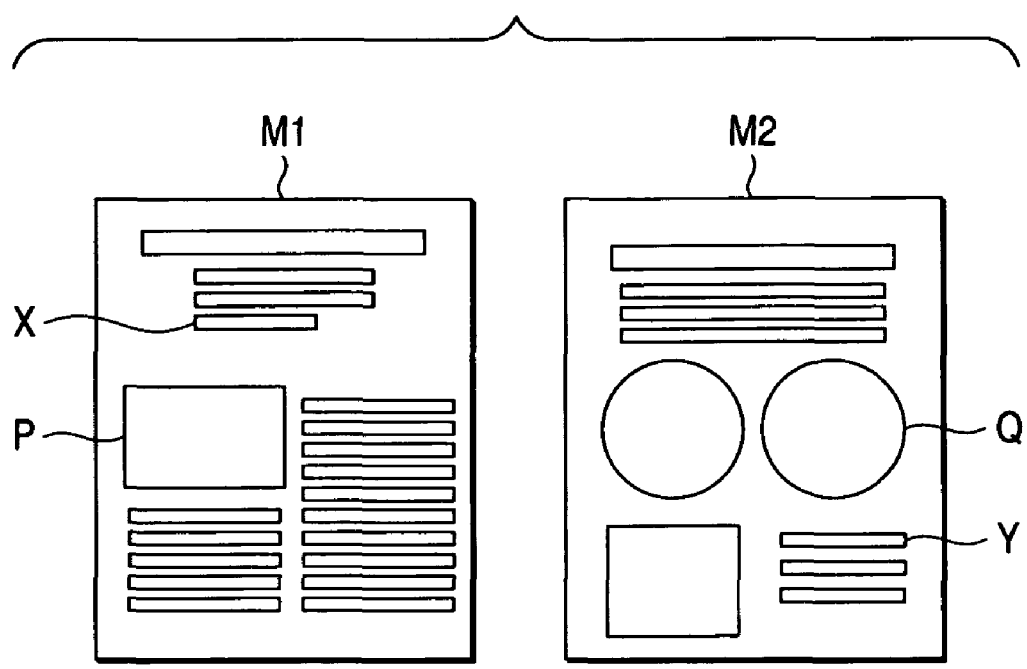
FIG. 11 is an explanatory diagram of one example of a document targeted for display processing in the exemplary embodiment of the invention.

In this case, for example, a first document (M1) of the plural candidate documents included in the candidate document table includes a photograph P and a character string X including a particular keyword as a limit target part, and a second document (M2) includes a figure Q and a character string Y as a limit target part as shown in FIG. 11.

In this case, the display authorization decision part 14 decides whether or not identification information about a user targeted for authentication is included in authorized person identification information (FIG. 10) associated with each of the limit target parts in processing of decision as to whether or not to authorize display of a target document (S102 of FIG. 6) or processing of decision as to whether or not to lift a limit on display of a target document (S202 of FIG. 8, S302 of FIG. 9).

That is, for example, when the display command acceptance part 11 accepts a command to give instructions to newly display the first document (M1) and the second document (M2) shown in FIG. 11 on the screen S inside the meeting room R in which three users of a first user (A), a second user (B) and a third user (C) stay as shown in FIG. 3a, the display authorization decision part 14 decides whether or not each of the authentication target identification information A, B, C accepted from the authentication information acquisition part 13 is included in authorized person identification information associated with each of the limit target parts included in the first document or the second document (S102 of FIG. 6).

Then, in this case, the identification information B about the second user of the three pieces of authentication target identification information A, B, C is not included in authorized person identification information about the limit target part X of the two limit target parts X, P included in the first document and the two limit target parts Y, Q included in the second document (FIG. 10), so that the display authorization decision part 14 decides that display of the limit target part X should be limited (Yes in S102 of FIG. 6).

Figure 12:
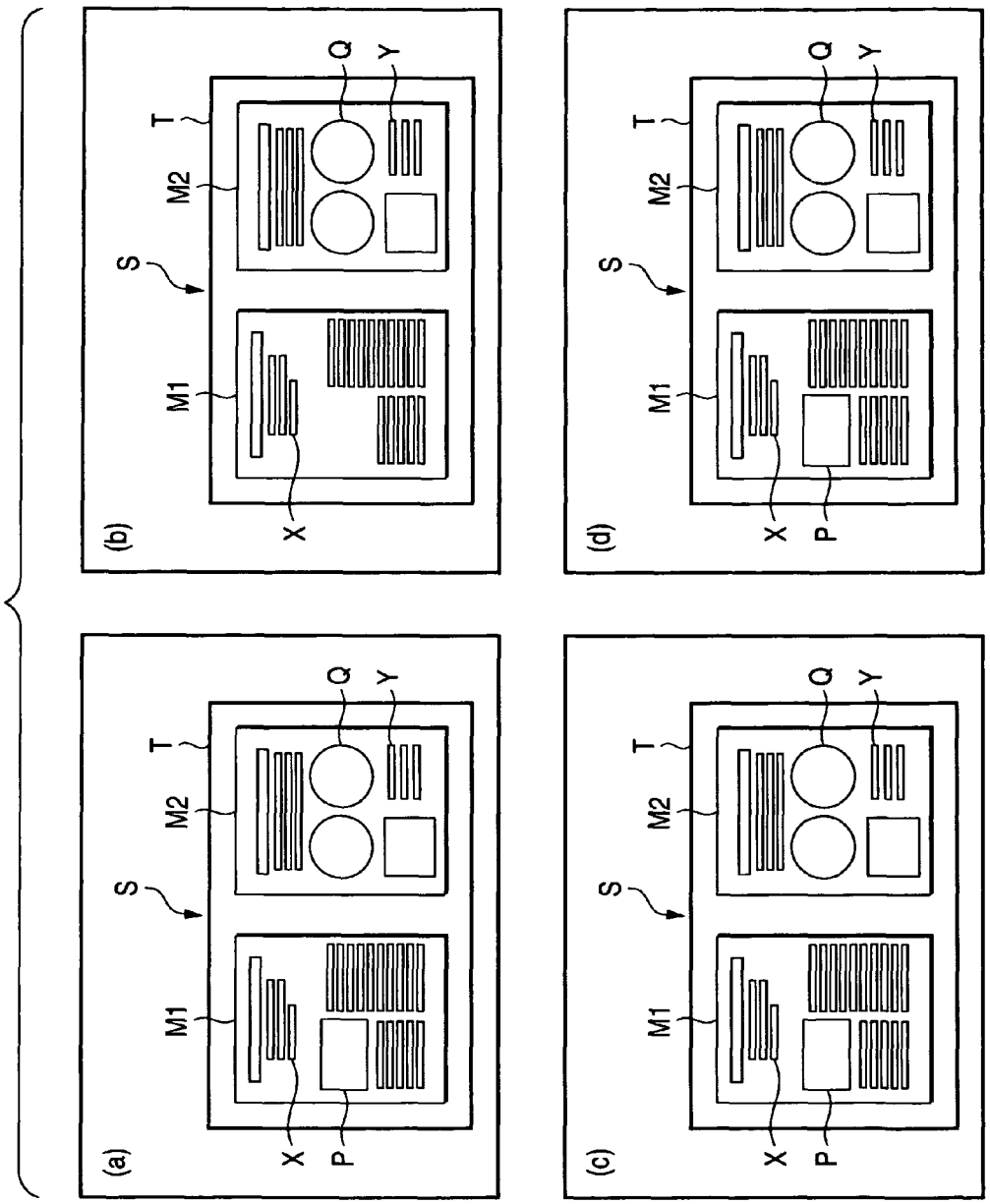
FIG. 12 is an explanatory diagram of another example of a document displayed on a display part in the exemplary embodiment of the invention.

As a result of this, the display processing part 15 displays the first document in which display of the limit target part X is limited and the second document in which display of all the limit target parts is not limited on a part of the screen S by displaying the limit target part X in a solid fill state so that the limit target part X cannot be visually recognized as shown in FIG. 12a according to the display limit contents (solid fill) associated with the limit target part X determined as a display limit target in the candidate document table (FIG. 10).

Also, in this case, the processing target data generation part 12 generates a data table of mutually associating identification information (M1, M2) about each of the target documents targeted for a display command, partial identification information (X, P, etc.) about a limit target part included in each of the target documents, authorized person identification information (A, B, etc.) about each of the limit target parts, the contents ("non-display" or "solid fill") of display limit processing related to each of the limit target parts and display state information indicating whether or not display of each of the limit target parts is limited as processing target data based on the decision result accepted from the display authorization decision part 14 as shown in FIG. 13.

Also, for example, when the fourth user (D) attempts to enter the meeting room R thereafter as shown in FIG. 3b, the display authorization decision part 14 decides whether or not entrance room person identification information D accepted from the authentication information acquisition part 13 is included in authorized person identification information about each of the limit target parts whose display is not limited with reference to processing target data (FIG. 13) held by the processing target data generation part 12, and decides whether or not display of each of the limit target parts should be limited based on the decision result (S202 of FIG. 8).

Then, the entrance room person identification information D is not included in authorized person identification information about the limit target part P included in the first document displayed on the screen S and authorized person identification information about one limit target part Y of the two limit target parts included in the second document (FIG. 13), so that the display authorization decision part 14 decides that display of the two limit target parts P, Y should be limited (Yes in S202 of FIG. 8).

In this case, the display processing part 15 performs display limit processing in which the limit target part P of the first document is set at non-display and the limit target part Y of the second document is set at solid fill display according to the display limit contents associated with the limit target parts P, Y determined as new display limit targets in the candidate document table (FIG. 10) as shown in FIG. 12*b*. Also, the processing target data generation part 12 updates the processing target data so that display state information about the limit target parts P, Y whose display is newly limited is changed into a state "in limit on display".

Also, for example, when the fourth user (D) exits from the meeting room R thereafter as shown in FIG. 3*e*, the display authorization decision part 14 decides whether or not plural pieces of stay room person identification information A, B, C acquired after the fourth user exits from the room are included in authorized person identification information about each of the limit target parts whose display is limited with reference to the processing target data held by the processing target data generation part 12, and decides whether or not a limit on display of each of the limit target parts can be lifted based on the decision result (S302 of FIG. 9).

Then, all the three pieces of stay room person identification information are included in authorized person identification information associated with the two limit target parts P, Y of the three limit target parts X, P, Y whose display is limited (FIG. 13), so that the display authorization decision part 14 decides that limits on display of the two limit target parts P, Y may be lifted (Yes in S302 of FIG. 9). In this case, the display processing part 15 lifts the limits on display of the limit target parts P, Y, and again displays the limit target parts P, Y so that the limit target parts can be visually recognized as shown in FIG. 12*c*.

Also, for example, when the second user (B) further exits from the meeting room R as shown in FIG. 3*f*, the display authorization decision part 14 decides whether or not two pieces of stay room person identification information A, C acquired after the second user exits from the room are included in authorized person identification information about the limit target part X whose display is limited with reference to the processing target data held by the processing target data generation part 12, and decides whether or not a limit on display of each of the limit target parts can be lifted based on the decision result.

Then, both the two pieces of stay room person identification information A, C are included in authorized person identification information associated with the limit target part X whose display is limited (FIG. 13), so that the display authorization decision part 14 decides that a limit on display of the limit target part X may be lifted. In this case, the display processing part 15 lifts the limit on solid fill of the limit target part X, and newly displays the limit target part X on the first document so that the limit target part can be visually recognized as shown in FIG. 12*d*.

Incidentally, the document display control apparatus according to the invention is not limited to the examples described above. That is, for example, a security level associated with each of the users may be used as authentication information. In this case, for example, a display authorization condition of authorizing display of a target document when the acquired security level of the user is more than or equal to a predetermined threshold value can be used. Also, for example, a pattern (such as a fingerprint or a retina) unique to each of the users can be used as authentication information. In this case, for example, a display authorization condition of authorizing display of a target document in the case of deciding that the acquired fingerprint pattern of the user matches with a fingerprint pattern previously registered and associated with the target document can be used.

As described so far, according to an aspect of the present invention, a display control apparatus for controlling display of a document on a display part includes an acquiring section that acquires authentication information associated with a user entering a predefined area, a deciding section that decides whether or not the authentication information acquired by the acquiring section satisfies a display authorization condition associated with the document, and a limiting section that limits display of the document on the display part when the deciding section decides that the authentication information does not satisfy the display authorization condition.

The limiting section may limit display of the document on the display part by limiting display of the part of the document when the deciding section decides that the authentication information does not satisfy the authorization condition.

The display control apparatus may further include a memory that stores the display authorization condition associated with the document.

The display control apparatus may further include an entrance control section that controls entrance of a user into the predefined area. When the deciding section decides that the authentication information does not satisfy the display authorization condition, the limiting section may limit display of the document on the display part, and the entrance control section may authorize a user, whose authentication information does not satisfy the display authorization condition, to enter the predefined area after the limit of display by the limiting section is completed.

The display control apparatus may further include a data generating section that updates data indicating a display state every time the display state is changed. The memory may further store the data indicating a display state of the document on the display part, the data being updated by the data generating section.

According to another aspect of the present invention, a display control apparatus for controlling display on a display part includes an acquiring section that acquires authentication information associated with at least one of a user entering a predefined area, a user exiting from the predefined area and a user staying in the predefined area, and a control section that controls display of at least a part of a display region of the display part based on the acquired authentication information.

The display control apparatus may further include a memory that stores data indicating a display state on the display part, and a data generating section that updates the data every time the display state is changed.

The display control apparatus may further include an entrance control section that controls entrance of a user into the predefined area. The acquired authentication information may be information about the user entering the predefined area, the control section may include a limiting section that limits display of at least the part of the display region of the display part based on the acquired authentication information, and the entrance control section authorizes a user specified by the acquired authentication information to enter the predefined area after the limit of display by the limiting section is completed.

According to still another aspect of the present invention, a method for controlling display of a document on a display part includes acquiring authentication information associated with a user entering a predefined area, deciding whether or not the acquired authentication information satisfies a display authorization condition associated with a document, and limiting display of the document on a display part when the acquired authentication information does not satisfy the display authorization condition.

According to still another aspect of the present invention, a storage medium readable by a computer stores a program of instructions executable by the computer to perform a function for controlling display of a document on a display part. The function includes acquiring authentication information associated with a user entering a predefined area, deciding whether or not the acquired authentication information satisfies a display authorization condition associated with a document, and limiting display of the document on a display part when the acquired authentication information does not satisfy the display authorization condition.

The invention claimed is:

1. A display control apparatus for controlling display of a document on a display part, comprising:
    an acquiring section that acquires authentication information associated with a user entering a predefined area;
    a deciding section that decides whether or not the authentication information acquired by the acquiring section satisfies a display authorization condition associated with at least a part of the document being displayed on the display part before the user enters the predefined area; and
    a limiting section that limits display of the document on the display part when the deciding section decides that the authentication information does not satisfy the display authorization condition.

2. The display control apparatus as claimed in claim 1, wherein:
    the display authorization condition is associated with a part of the document; and
    the limiting section limits display of the document on the display part by limiting display of the part of the document when the deciding section decides that the authentication information does not satisfy the authorization condition.

3. The display control apparatus as claimed in claim 1, further comprising:
    a memory that stores the display authorization condition associated with the document.

4. The display control apparatus as claimed in claim 3, further comprising:
    a data generating section that updates data indicating a display state every time the display state is changed,
    wherein the memory further stores the data indicating a display state of the document on the display part, the data being updated by the data generating section.

5. The display control apparatus as claimed in claim 1, further comprising:
    an entrance control section that controls entrance of a user into the predefined area,
    wherein, when the deciding section decides that the authentication information does not satisfy the display authorization condition, the limiting section limits display of the document on the display part, and the entrance control section authorizes a user, whose authentication information does not satisfy the display authorization condition, to enter the predefined area after the limit of display by the limiting section is completed.

6. A display control apparatus for controlling display of a document on a display part, comprising:
    an acquiring section that acquires authentication information associated with a user entering a predefined area;
    a deciding section that decides whether or not the authentication information acquired by the acquiring section satisfies a display authorization condition associated with at least a part of the document;
    a limiting section that limits display of the document on the display part when the deciding section decides that the authentication information does not satisfy the display authorization condition; and
    an entrance control section that controls entrance of a user into the predefined area,
    wherein, when the deciding section decides that the authentication information does not satisfy the display authorization condition, the limiting section limits display of the document on the display part, and the entrance control section authorizes a user, whose authentication information does not satisfy the display authorization condition, to enter the predefined area after the limit of display by the limiting section is completed.

7. A display control apparatus for controlling display on a display part, comprising:
    an acquiring section that acquires authentication information associated with at least one of a user entering a predefined area and a user exiting from the predefined area;
    a control section that controls display of at least a part of a display region of the display part based on the acquired authentication information, the display being displayed before the user enters the predefined area, and removes control on the display after the user exits from the predefined area;
    a memory that stores data indicating a display state on the display part; and
    a data generating section that updates the data every time the display state is changed.

8. A display control apparatus for controlling display on a display part, comprising:
    an acquiring section that acquires authentication information associated with at least one of a user entering a predefined area and a user exiting from the predefined area;
    a control section that controls display of at least a part of a display region of the display part based on the acquired authentication information, the display being displayed before the user enters the predefined area, and removes control on the display after the user exits from the predefined area;
    an entrance control section that controls entrance of a user into the predefined area, wherein the acquired authentication information is information about the user entering the predefined area, the control section includes a limiting section that limits display of at least the part of the display region of the display part based on the acquired authentication information, and the entrance control section authorizes the user specified by the acquired authentication information to enter the predefined area after the limit of display by the limiting section is completed.

9. A method for controlling display of a document on a display part, comprising:

acquiring authentication information associated with a user entering a predefined area;

deciding whether or not the acquired authentication information satisfies a display authorization condition associated with at least a part of the document being displayed on the display part before the user enters the predefined area by a processor; and limiting display of the document on a display part by limiting display of the part of at least the document when the acquired authentication information does not satisfy the display authorization condition.

10. A storage medium readable by a computer, the storage medium storing a program of instructions executable by the computer to perform a function for controlling display of a document on a display part, the function comprising:

acquiring authentication information associated with a user entering a predefined area;

deciding whether or not the acquired authentication information satisfies a display authorization condition associated with a document being displayed on the display part before the user enters the predefined area; and limiting display of the document on a display part when the acquired authentication information does not satisfy the display authorization condition.

* * * * *